April 21, 1931.  J. FREUDER  1,802,206
WINDOW CLEANER
Filed Aug. 22, 1929   2 Sheets-Sheet 1
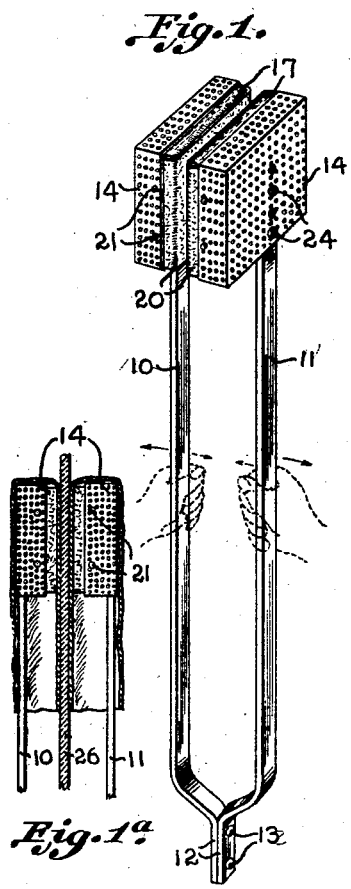
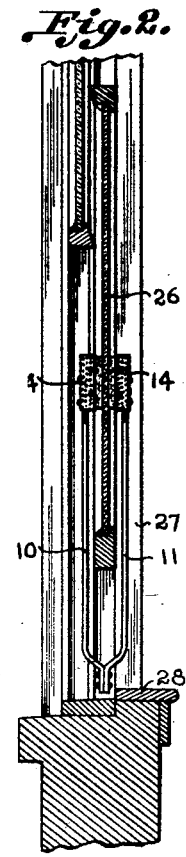
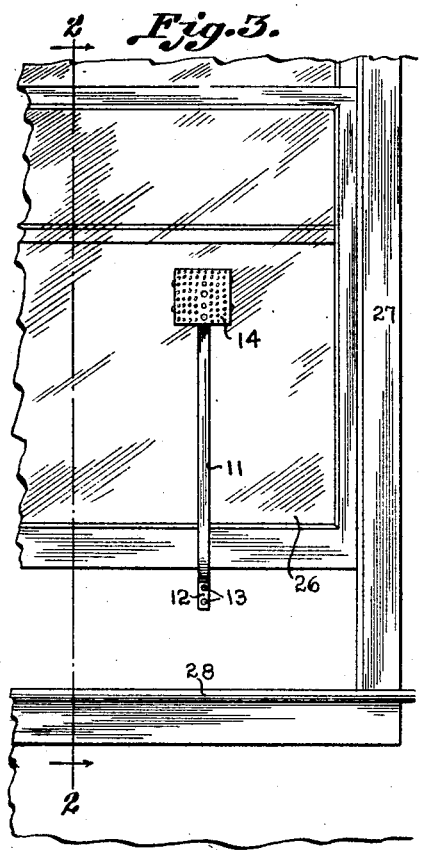
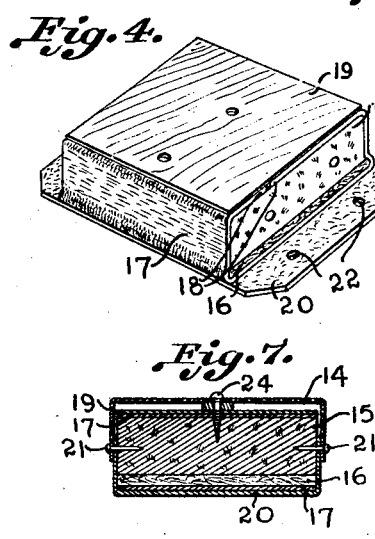
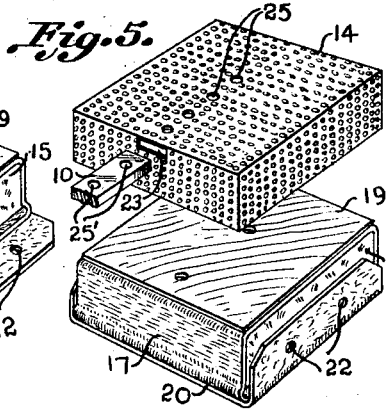
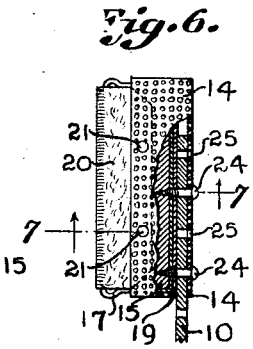
INVENTOR.
J. Freuder
BY
ATTORNEYS.

April 21, 1931.                J. FREUDER                1,802,206
                              WINDOW CLEANER
                    Filed Aug. 22, 1929      2 Sheets-Sheet 2
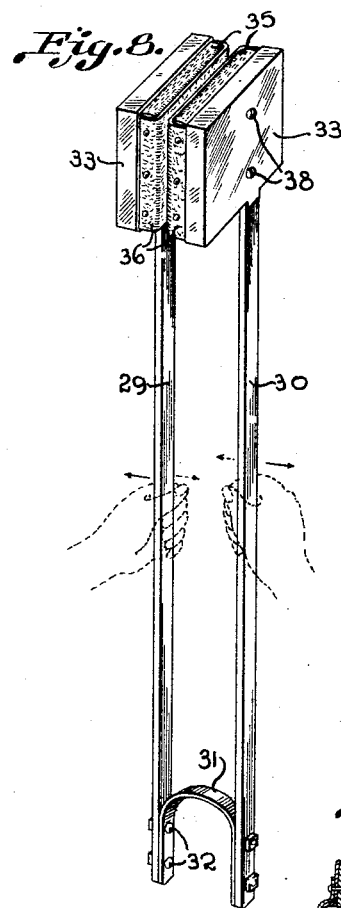
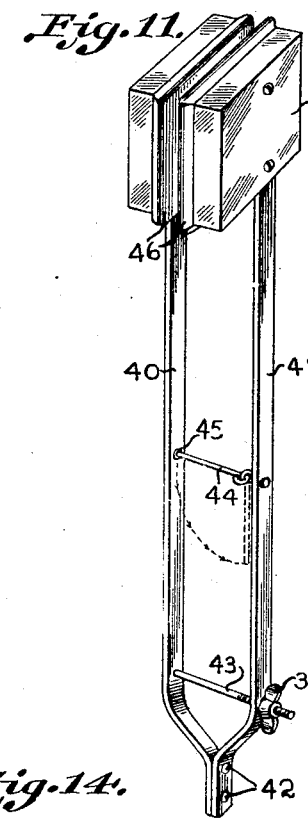
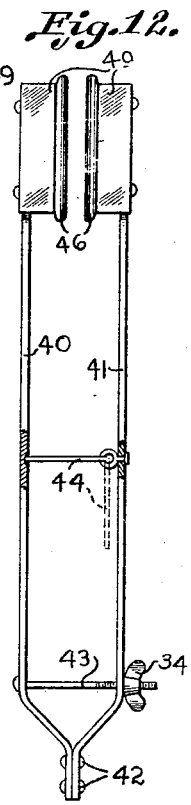
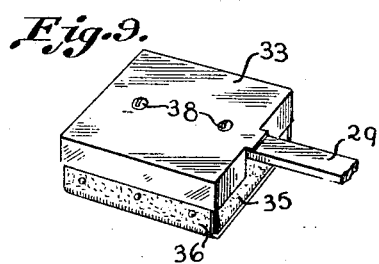
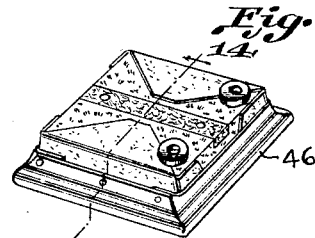
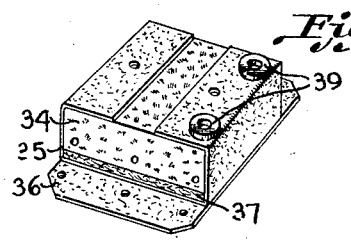
INVENTOR.
J. Freuder
BY
ATTORNEYS.

Patented Apr. 21, 1931

1,802,206

UNITED STATES PATENT OFFICE

IGNATZ FREUDER, OF NEW YORK, N. Y.

WINDOW CLEANER

Application filed August 22, 1929. Serial No. 387,768.

The present invention relates to window wipers, and has for an object to provide an implement of this character which may be easily carried in the hand, applied by hand and operated by hand.

Another object of the present invention is to provide a window wiper with a pair of wiping members and means for connecting the members together in such manner that the members are urged toward each other and to admit of the placing of the implement in an edgewise manner upon a sash or over a pane of glass or the like with a wiping member at each side of the glass so that the wiping members frictionally engage the opposite sides of the glass and are braced against each other; the implement being adapted to be reciprocated and otherwise moved by hand to wipe the opposite sides of the glass at the same time.

Another object of the present invention is to provide an improved construction of wiping member for carrying different applicators for applying moisture or water to the window panes, for wiping the window panes, and for polishing or otherwise cleaning it as desired.

Specifically, the invention has for an object to provide a pair of wiper holders and a pair of connected arms which are urged toward each other but are spaced apart and connected to the holders, the arms being of sufficient length to admit of the movement of the holders over the opposite sides of a pane of glass or the like, one of the arms being adapted to be grasped for manipulating both of the holders simultaneously.

The above, and various other objects and advantages of this invention will in part be described in, and in part be understood from, the detailed description of the present preferred embodiment, the same being illustrated in the accompanying drawings, wherein:—

Figure 1 is a perspective view of an implement constructed according to the present invention, the dotted lines showing the hand grasping the instrument for spreading the arms and wipers thereof.

Figure 1—A is a fragmentary sectional view of the upper end of the implement as applied to a pane of glass and having hoods or wiping cloths engaged over the implement.

Figure 2 is a fragmentary vertical section taken through a window showing the implement as applied to the lower sash thereof, the section being taken on line 2—2 of Figure 3.

Figure 3 is a fragmentary inner side elevation of a window showing the implement as applied to the lower sash thereof.

Figure 4 is a detail perspective view, enlarged, of one of the wiping elements with the casing removed and showing one of the cloths prior to folding.

Figure 5 is a similar view showing the wiping cloth in folded position and the casing in place ready to enclose the wiping member, a portion of one of the supporting arms being shown removed from the casing.

Figure 6 is a side elevation, partly in section, of one of the wiping elements.

Figure 7 is a transverse section taken through the same substantially on the line 7—7 of Figure 6.

Figure 8 is a perspective view of a slightly modified construction of the window wiper.

Figure 9 is a detail enlarged perspective view of one of the wiping elements with the adjacent supporting arm.

Figure 10 is a detail perspective view of the filler portion of the wiping element with the casing removed.

Figure 11 is a perspective view of a wiper constructed according to the present invention and showing a further modification therein.

Figure 12 is an edge view of the same.

Figure 13 is a detail perspective view of the filler portion of one of the wiping elements of the modification shown in Figure 11.

Figure 14 is a transverse section taken through the same substantially on the line 14—14 of Figure 13.

Referring now to the drawings, and first to the form disclosed in Figures 1 to 7 inclusive, 10 and 11 designate a pair of supporting arms which are preferably of duraluminum or other suitable metal not subject to rust, and which also preferably have an inherent spring characteristic for maintaining the arms 10 and 11 substantially in parallel relation and admitting of the springing of the arms apart when desired. The arms 10 and 11 at one end, which may be termed the lower end of the implement, are offset inwardly to provide a pair of shanks 12 which are adapted to abut in face relation and are secured rigidly together by rivets 13 or the like as shown in Figure 1. The offset portions of the arms 10 and 11 may be in any suitable shape for the purpose of design, and also for the purpose of spacing the arms 10 and 11 apart to the desired extent, and further for the purpose of resiliently connecting the arms 10 and 11 together so that the arms may flex under pressure for spreading the arms as shown by the arrows in Figure 1, and so that the arms 10 and 11 by their inherent resiliency will spring backwardly into normal position as shown by the inside arrows.

The arms 10 and 11 are preferably disposed in parallel relation throughout their upper or length and are consequently spaced apart at their outer end. Each arm is provided with a wiper element, and each element may comprise a perforated casing 14 of sheet metal or the like and which may be of box like structure, the casing 14 being open at one side and adapted to receive therein a filler block 15 of cork or other non-absorbent material, light in weight.

The filler block 15 is provided with a pad 16 upon its outer face which may be formed of any suitable water absorbing material and which is held in place by a cover strip 17 of porous flexible material which is wrapped in one direction around the block 15 and has its free ends 18 locked against the inner side of the block 15, as shown in Figure 4. A holding strip or plate 19, of wood, veneer or the like, is fitted over the ends 18 of the cover strip 17 and, when the device is assembled is adapted to hold the free ends 18 rigidly upon the block 15. An outer contact strip 20 is fitted over the outer side of the retaining strip 17 and preferably extends at right angles thereto, as shown in Figures 4 and 5, and has its free ends upturned against the side of the block 15 and held in place by pin 21 or the like. When the filler block 15, with its parts, are assembled as shown in Figure 5, it is inserted in the casing 14 so that the parts are assembled as shown in Figure 7. It will be noted that the pins 21 engage through openings in the opposite sides of the casing 14 and through openings 22 which are formed in the free end of the outer covering strip 20, so that the covering strip 20 is held securely on the wiping element.

The casing 14 is provided in one end with a slot 23 which is located near the closed side of the casing 14 and is of sufficient size and so shaped as to slidably receive the free end of one of the arms, such as the arm 10 therein. The arm 10 is adapted to be slid inwardly through the slot 23 to the desired extent, such as shown in Figure 6, when the arm 10 is secured to the casing and also the filler block by means of screws 24 or the like.

The screws 24 are passed inwardly through openings 25 which are formed in the closed side of the casing 14, and these openings 25 may be in any desired number and arrangement so as to receive the screws 24 for variously adjusting the arm in the casing. From Figure 6 it will be noted that the arm 10 is of sufficient thickness to take up the space between the closed side of the casing 14 and the cover strip or plate 19, and that the screws 24 engage through the casing, the arm 10, the plate 19 and the overturned ends 18 of the retaining strip 17, and finally are threaded into the block 15. Each arm, such as the arm 10, is provided with spaced openings 25' for the reception of the screw 24, and it will be apparent that when the arm 10 is slid more or less into the casing to register with the desired opening 25, the wiper element may be adjustably secured upon the upper end of the arm 10.

These wiping elements are adapted to carry a certain amount of moisture or water and may be dipped into a bucket or the like prior to the application of the implement to the window.

In applying the implement to a window, and such as to the lower sash thereof as shown in Figures 2 and 3, the lower sash 26 is raised in the window casing 27 so as to leave a space between the lower edge of the sash 26 and the window sill 28. The arms 10 and 11 of the implement are now spread apart so as to spread the wiping members sufficiently to receive the lower edge of the sash 26 there between, and the implement is thus positioned upwardly with a wiping member against each side of the sash.

As soon as the arms 10 and 11 are released, the resiliency of the arms causes the wiping members to immediately close or move toward each other and bind against the opposite sides of the pane of the window sash 26. By grasping either of the arms 10 and 11, or both of them, or the lower end of the implement, the implement may be raised and lowered or moved back and forth in any desired direction so as to rub the wiping elements over the opposite sides of the pane of glass. The advantage of this structure is that it is unnecessary to lean out of the window or to reach against the outside of the sash because the operator may grasp the inner arm, such as the arm 10, and move the entire implement as a unit in the desired direction.

Referring now to the modification of the invention which is disclosed in Figures 8, 9 and 10, the implement comprises a pair of arms 29 and 30 which may be relatively rigid and connected together at their lower ends by a bowed U shaped spring 31. The spring 31 is disposed between the lower ends of the arms 29 and 30 and the opposite sides of the spring are riveted or otherwise suitably secured at 32 to the arms. The spring 31 is adapted to normally expand and to thus swing the free end portions of the arms 29 and 30 toward each other. On the free end of each arm there is mounted a wiping element, each wiping element comprising a sheet metal imperforate casing 33 having suitable depth to receive in the open side thereof a filler block 34 of cork or the like. The block 34 is provided with the crossed flexible strips 35 and 36, the strip 35 engaging an absorbing pad 37 of felt or the like which is disposed against the outer side of the block 34.

The free ends of the strip 35 are lapped against the inner side of the block 34, as shown in Figure 10, and the free ends of the strip 36 are merely turned upwardly against the opposite edge portions of the block 34 and are adapted to be secured in position in the same manner as is shown in connection with the strip 20 in Figures 5 and 7.

The overturned ends of the strip 35 are adapted to receive there-across the free end portion of the adjacent arm, such as the arm 29, and are held in place with screws 38 which engage thru the casing 33 and thru the overturned ends of the strip 35, and are threaded into the block 34. If desired, spacers 39 may be placed against the inner side of the block 34 between the overturned ends of the strip 35 and the inner side of the casing 33 so as to provide ample space for the arm 29.

This form of the invention is applied and used in the manner above described, the structure however being slightly different than the preferred form and adapting the device to more economical manufacture under some conditions.

Referring now to the modifications shown in Figures 11 to 14, the implement is provided with a pair of spring arms 40 and 41 which are offset inwardly toward each other as shown at the lower end of Figure 11 and are secured together at their lower ends by rivets 42. In order to vary the tension on the outer ends of the arms 40 and 41, an adjusting bolt 43 is secured through the lower end portions of the arms 40 and 41 above the offset portions of the arms and is provided with a thumb nut 34 adapted to be turned up against the outer side of one of the arms, such as the arm 41, for drawing the bolt 43 through the arms and thus urging the arms toward each other at their free ends to a greater extent.

In this form of the invention one of the arms, such as the arm 41, may be provided with a spacing rod 44 which is hinged to the arm 41 and extends between the arms. The arm 40 may have upon its inner side a depression or socket 45 for receiving the free end of the arm 44 when the latter is extended, as shown in full lines in Figure 11. The dotted lines in Figures 11 and 12 show the arm 44 when not in use, and at which time the arm 44 hangs downwardly against the inner side of the arm 41.

The structure of the wiping element shown in the form of the invention in Figures 11 to 14 is slightly modified and a chamois 46 or other suitable wiping cloth is stretched across the outer side of the block 47 by a pad 48 of fibrous material, the pad being enlarged to extend beyond the sides and ends of the block 47 and thus hold the chamois 46 beyond the casing 49 to cover a relatively large surface area.

The spacing arm or rod 44 is employed when it is desired to hold the wiping elements apart, as shown in Figures 11 and 12, and the rod or bolt 43 is employed for holding the arms 40 and 41 in binding engagement with the rod 44.

It is of course understood that various changes and modifications may be made in the details of construction and design of the above specifically described embodiments of this invention without departing from the spirit thereof, the changes and modifications being restricted only by the scope of the following claims.

What is claimed is:

1. A window cleaner comprising a pair of arms normally urged toward each other, and a wiping element mounted upon the free end of each arm, each wiping element comprising a casing having a slot therein for the reception of the arm, a filler block in the casing, a pad against the filler block, crossed layers of fabric stretched over the outer side of the pad and the filler block and having their free ends extended inwardly along the opposite edges of the filler block, and means for securing the filler block with its parts in said casing, said means engaging the arm for holding the parts together.

2. A window cleaner comprising a pair of spring urged arms secured in spaced apart relation and biased toward one another at their free ends, a wiper element mounted upon the free end of each arm, the wiper element comprising a casing having a slot therein for engagement over the arm, a filler block mounted in the casing against each arm, wiper strips secured over the block and having their free ends engaged in said casing, and a pad arranged between the filler block and the strips to cushion the latter against a window pane when the device is used.

3. A window cleaner comprising a resilient yoke adapted for engagement over a window sash, and a wiping element mounted upon the free end of each arm of the yoke, each wiping element comprising an open sided casing, a filler block mounted in the casing, a resilient pad mounted against the outer side of the filler block, and wiper cloths mounted upon the block and engaging over said pad and having their end portions secured between the block and the casing.

4. A window cleaner comprising, a substantially U-shaped frame, and a pair of companion wiping elements, one of such elements being mounted on the free end of each arm, each of said wiping elements comprising a perforated casing connected to its respective arm and having an opening confronting its companion wiping element, a filler block of nonabsorbent material in said casing spaced from the perforated walls thereof, an absorbent pad on the block facing the companion wiping elements, and a wiping cloth extending over said pad and a portion of the block and having its marginal portions between the block and perforated walls of the casing.

JGNATZ FREUDER.